US006836794B1

(12) United States Patent
Lucovsky et al.

(10) Patent No.: US 6,836,794 B1
(45) Date of Patent: Dec. 28, 2004

(54) METHOD AND SYSTEM FOR ASSIGNING AND PUBLISHING APPLICATIONS

(75) Inventors: Mark Lucovsky, Redmond, WA (US); Michael J. Cherry, Redmond, WA (US); Daniel Plastina, Issaquah, WA (US); Bharat Shah, Bellevue, WA (US); Debi P. Mishra, Redmond, WA (US); David E. Kays, Jr., Carnation, WA (US); Markus Horstmann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/158,968

(22) Filed: Sep. 21, 1998

(51) Int. Cl.[7] .............................................. G06F 9/445
(52) U.S. Cl. ...................................... 709/223; 717/177
(58) Field of Search ................................ 709/219, 223, 709/224, 225, 229, 226; 717/177

(56) References Cited

U.S. PATENT DOCUMENTS

| | | | |
|---|---|---|---|
| 5,155,847 A | * 10/1992 | Kirouac et al. ............. | 709/221 |
| 5,421,009 A | 5/1995 | Platt ........................... | 395/600 |
| 5,473,772 A | 12/1995 | Halliwell et al. ........... | 395/650 |
| 5,535,326 A | 7/1996 | Baskey et al. ......... | 395/182.02 |
| 5,555,416 A | 9/1996 | Owens et al. ............... | 395/700 |
| 5,586,304 A | 12/1996 | Stupek, Jr. et al. ......... | 395/712 |
| 5,625,823 A | 4/1997 | Debenedictis et al. ...... | 395/706 |
| 5,630,076 A | 5/1997 | Saulpaugh et al. ......... | 395/284 |
| 5,644,766 A | 7/1997 | Coy et al. .................... | 395/620 |
| 5,655,081 A | 8/1997 | Bonnell et al. ............. | 709/202 |
| 5,659,547 A | 8/1997 | Scarr et al. .................... | 714/4 |
| 5,692,129 A | 11/1997 | Sonderegger et al. ... | 395/200.11 |
| 5,732,266 A | * 3/1998 | Moore et al. ................. | 713/1 |
| 5,732,275 A | 3/1998 | Kullick et al. ............... | 717/11 |
| 5,742,829 A | 4/1998 | Davis et al. ................. | 395/712 |
| 5,752,042 A | 5/1998 | Cole et al. ................... | 395/712 |
| 5,764,992 A | 6/1998 | Kullick et al. .............. | 395/712 |
| 5,768,566 A | 6/1998 | Harikrishnan et al. ...... | 395/500 |
| 5,778,234 A | 7/1998 | Hecht et al. ................. | 395/712 |
| 5,784,612 A | 7/1998 | Crane et al. ................. | 713/100 |
| 5,790,664 A | 8/1998 | Coley et al. .................... | 380/4 |
| 5,790,856 A | 8/1998 | Lillich ........................ | 395/703 |
| 5,796,967 A | 8/1998 | Filepp et al. ................ | 345/339 |
| 5,805,897 A | 9/1998 | Glowny ........................ | 717/11 |
| 5,835,911 A | 11/1998 | Nakagawa et al. ......... | 707/203 |
| 5,859,969 A | 1/1999 | Oki et al. ................. | 395/200.3 |
| 5,859,978 A | 1/1999 | Sonderegger et al. ... | 395/200.56 |

(List continued on next page.)

*Primary Examiner*—Dung C. Dinh
(74) *Attorney, Agent, or Firm*—Law Offices of Albert S. Michalik, PllC

(57) ABSTRACT

A method and system for managing and deploying applications across a computer network by assigning and publishing applications to user and computer policy recipients. Assigned applications are automatically applied via a script to the policy recipients, thereby ensuring that the recipient has an administrator-specified workstation configuration. Assigned applications are advertised so as to appear available to the user, by adding an application shortcut to the start menu, and by populating the machine registry with appropriate application information. Other applications may be published to users, whereby those applications are optionally available for use by users. Published application information is maintained in a centralized store of information on the network. Assigned and published applications may be installed on demand, such as when the application is activated.

41 Claims, 9 Drawing Sheets

U.S. PATENT DOCUMENTS

| | | | | |
|---|---|---|---|---|
| 5,867,713 | A | | 2/1999 | Shrader et al. ............. 395/712 |
| 5,867,714 | A | | 2/1999 | Todd et al. .................. 395/712 |
| 5,870,762 | A | | 2/1999 | Lee ............................ 707/202 |
| 5,897,640 | A | | 4/1999 | Veghte et al. ............... 207/202 |
| 5,925,127 | A | | 7/1999 | Ahmad ....................... 213/200 |
| 5,930,513 | A | | 7/1999 | Taylor ........................ 395/712 |
| 5,930,514 | A | | 7/1999 | Thompson et al. ......... 395/712 |
| 5,933,647 | A | | 8/1999 | Aronberg et al. ........... 395/712 |
| 5,954,827 | A | | 9/1999 | Frank et al. .................. 714/48 |
| 5,960,204 | A | | 9/1999 | Yinger et al. ............... 395/712 |
| 5,966,540 | A | | 10/1999 | Lister et al. ................ 395/712 |
| 5,978,590 | A | | 11/1999 | Imai et al. .................. 395/712 |
| 5,987,504 | A | | 11/1999 | Toga .......................... 709/206 |
| 5,995,756 | A | | 11/1999 | Herrmann ................... 395/712 |
| 5,999,740 | A | | 12/1999 | Rowley ...................... 395/712 |
| 6,006,034 | A | | 12/1999 | Heath et al. ................ 395/712 |
| 6,006,035 | A | | 12/1999 | Nabahi ....................... 395/712 |
| 6,009,274 | A | | 12/1999 | Fletcher et al. ............. 395/712 |
| 6,009,401 | A | | 12/1999 | Horstmann .................... 705/1 |
| 6,021,438 | A | | 2/2000 | Duvvoori et al. ........... 709/224 |
| 6,023,586 | A | * | 2/2000 | Gaisford et al. ............ 395/712 |
| 6,029,147 | A | | 2/2000 | Horadan et al. .............. 705/35 |
| 6,041,333 | A | | 3/2000 | Bretschneider et al. ..... 707/203 |
| 6,067,582 | A | | 5/2000 | Smith et al. .................... 710/5 |
| 6,075,943 | A | * | 6/2000 | Feinman ..................... 395/712 |
| 6,131,192 | A | | 10/2000 | Henry .......................... 717/11 |
| 6,138,153 | A | * | 10/2000 | Collins, III et al. ......... 709/221 |
| 6,151,643 | A | | 11/2000 | Cheng et al. ................. 710/36 |
| 6,151,708 | A | | 11/2000 | Pedrizetti et al. ............. 717/11 |
| 6,161,218 | A | | 12/2000 | Taylor .......................... 717/11 |
| 6,192,406 | B1 | * | 2/2001 | Ma et al. ..................... 709/226 |
| 6,199,204 | B1 | | 3/2001 | Donohue ...................... 717/11 |
| 6,202,207 | B1 | | 3/2001 | Donohue ...................... 717/11 |
| 6,205,527 | B1 | | 3/2001 | Goshey et al. .............. 711/162 |
| 6,212,536 | B1 | | 4/2001 | Klassen et al. ............. 707/513 |
| 6,219,786 | B1 | * | 4/2001 | Cunningham et al. ...... 713/152 |
| 6,314,565 | B1 | | 11/2001 | Kenner et al. ................ 717/11 |
| 6,324,693 | B1 | * | 11/2001 | Brodersen et al. ............ 717/11 |

OTHER PUBLICATIONS

"Automating Microsoft Transaction Server Client Installation," Microsoft Corporation, URL:wysiwyg://MAIN.PRODINFO.6/http://msdn.mi...m/library/backgrnd/html/msdn_install.html (Jun. 1997), printed Feb. 29, 2000.

"Seagate Enterprise Management Software–East Announces Release of Desktop Management Suite; Best–of–Breed Point Solutions Integrated to Provide Heterogenous LAN Management," *Business Wire*, p. 04020056 (Apr. 2, 1996).

Kelly, Mike, "Gain Control of Application Setup and Maintenance with the New Windows Installer," *Microsoft Systems Journal*, pp. 15–18, 20–23, 26–27 (Sep. 1998).

Lang, Jay., "IBM Bolsters Windows NT Reliability With Tools Suite," *Information Week*, p. A6ff (Jul. 20, 1998).

Dunigan, et al., *MCSE Training Guide: Windows NT Workstation 4*, New Riders Publishing, pp. 28–32, 402 405, 486–492 (1997).

Green, "Windows Apps Need To Be Aware of Install Methods", *Network World*, p. 45 (Nov. 1994).

McKinney et al., "Win Tips Windows 9x", *Windows Magazine*, pp. 255–258 (Aug. 1998).

McNutt, "Administering X Sites", *Unix Review*, pp. 45ff (Jul. 1992).

Methvin, David, "Problems? In Win98?", *Windows Magazine*, pp. 224ff (Oct. 1998).

Spanbauer, Scott, "Internet Explorer 4.0, Problem Child", *PC World*, p. 53 (Jan. 1998).

Anonymous, "ADSTAR Distributed Storage Manager Basic Concepts," *IBM Storage Software*, http://www.storage.ibm.com/software/adsm/adbasics.htm pp. 1–8, (Oct. 31, 1997), printed Nov. 3, 1997.

Jones, Michael B., "The Microsoft Interactive System: An Experience Report," *Technical Report MSR–TR–97–18*, pp. 1–20, http://research.microsoft.com/~mbj/papers/mitv/tr–97–18.htm (Jul. 1997), printed Sep. 4, 2001.

* cited by examiner

METHOD AND SYSTEM FOR ASSIGNING AND PUBLISHING APPLICATIONS

RELATED APPLICATIONS

This application is related to the following United States Patent applications, all of which are filed on the same day and assigned to the same assignee as the present application:

"Method and System for Advertising Applications" Ser. No. 09/158,967, now U.S. Pat. No. 6,345,386, hereby incorporated by reference herein in its entirety;

"Class Store Schema" Ser. No. 09/158,023, now U.S. Pat. No. 6,389,589;

"Method and System for On-Demand Installation of Software Implementations" Ser. No. 09/158,022 and "Software Implementation Installer Mechanism" Ser. No. 09/158,021, now U.S. Pat. No. 6,418,554.

FIELD OF THE INVENTION

The invention relates generally to computer systems and networks, and more particularly to an improved method and system for deploying applications to users and computers in a network.

BACKGROUND OF THE INVENTION

In contemporary enterprises such as a corporation, one of the duties of a network administrator is to set up and maintain the corporation's computers so as to make employees more productive. Lost productivity at employees' computer desktops is a major cost for corporations, often resulting from user errors such as inadvertently removing some or all of a needed application or using an old application rather than an enterprise-specified one that is improved, secure and/or compatible with others. Productivity is also lost when a desktop is too complex, such as when the desktop has too many non-essential applications and features thereon. Much of the expense of administering distributed personal computer networks is spent at the desktop, performing tasks such as fixing the applications and settings that the user has incorrectly or inadvertently modified.

At the same time, an enterprise wants certain personnel to have access to various software applications, while wanting other applications to be available to certain users for access if needed. For example, a corporate enterprise may declare a policy specifying that everyone in the company should use a particular electronic mail program, while in addition, those in the research department should be able to load a particular spreadsheet application if needed. Similarly, the enterprise may decide that employees spend too much time browsing the Internet, whereby the enterprise desires that only certain groups such as the research group and management group should have Internet browsers installed on their machines.

However, to implement such policy decisions, administrators or the like generally need to physically visit each workstation to load or unload the specified programs, and spend time with the employees regarding the need for installing optional programs. In addition to initially setting the computers, the administrators must hope (or regularly check) that the users do not change the settings, however users regularly make modifications, leading to lost productivity. The administrator also needs to revisit the workstations to install new versions of applications.

Moreover, such policies cause problems when multiple users share the same computer, since a policy instituted for one user of that computer may not be compatible with the policy for another. As can be readily appreciated, deploying applications in an enterprise is a complex task that does not fit in well with existing systems and methods.

SUMMARY OF THE INVENTION

Briefly, the present invention provides a system and method for automatically deploying applications by assigning certain applications to users and machines in accordance with a policy. One or more advertising scripts are stored with a policy associated with computer or user policy recipients, and each advertising script includes an application assigned to the policy recipient. When one or more advertising scripts are applied, such as to a user at logon or a machine at re-boot, assigned applications are advertised as available to the user by placing application shortcuts on a start menu or desktop and by writing entries to the system registry such as to enable document invocation through the Windows shell and class activation through system components and applications, i.e., file-extension based activation and COM (Component Object Model) CLSID (class identifier)-based activation, respectively. In this manner, assigned applications may be advertised as available, prior to the actual installation thereof. An installer installs advertised applications as needed, i.e., upon user activation of the application. Other applications may be published, whereby they do not appear to be available, but are optionally available if activated (e.g., via file extension-based activation and CLSID-based activation) or manually installed by a user.

Other benefits and advantages will become apparent from the following detailed description when taken in conjunction with the drawings, in which:

DETAILED DESCRIPTION OF THE PREFERRED EMBODIMENT

Exemplary Operating Environment

Figure 1:
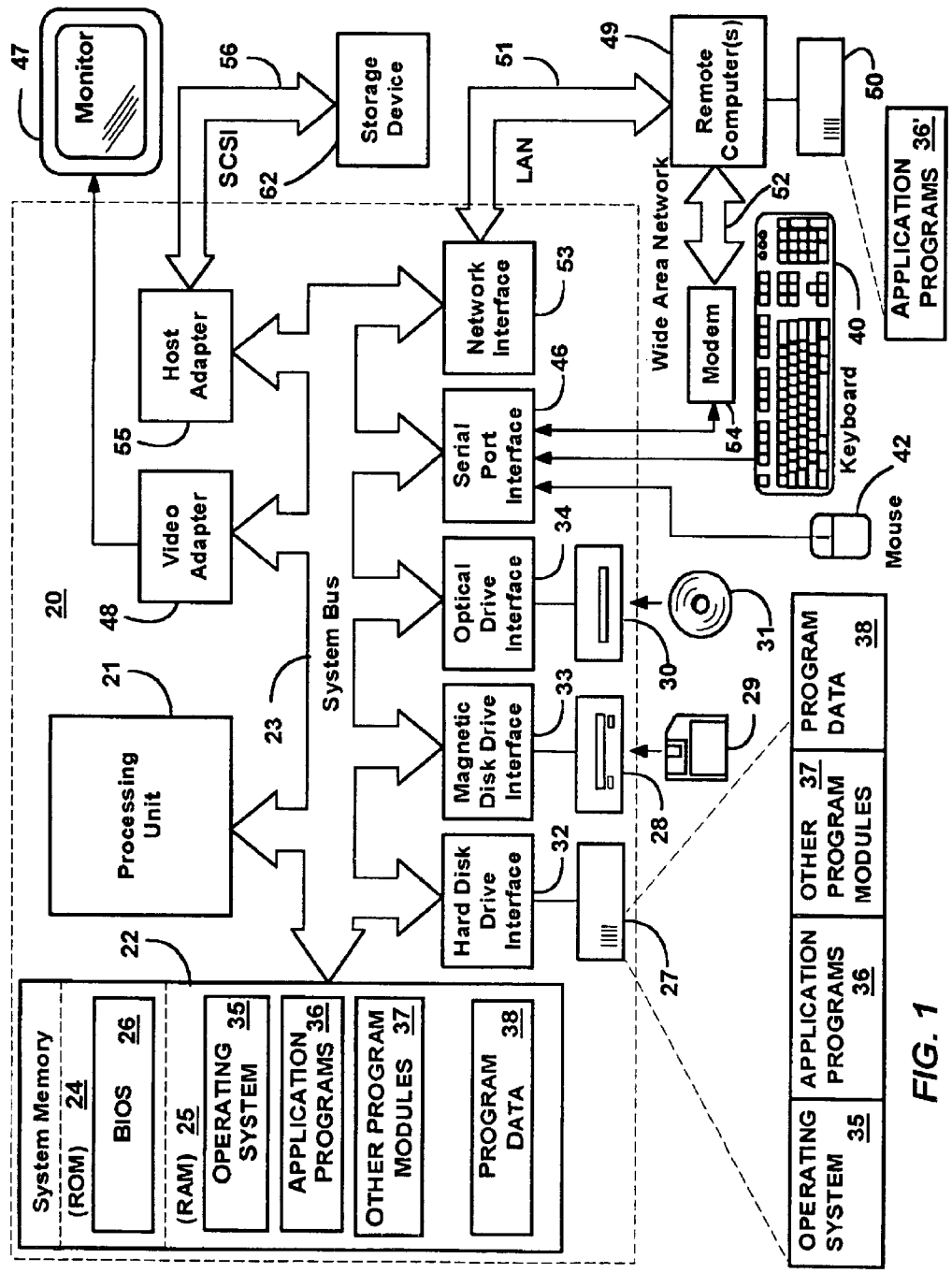
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only C memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted 610 relative to the personal computer 20, or portions thereof, may be stored in the remote memory storage device. It will be appreciated that the network connections shown are exemplary and other means of establishing a communications link between the computers may be used.

For purposes of the following description, a client workstation (e.g., 20₁) may correspond to the computer system 20, while an application package 60 (FIG. 3) may reside on one of the remote computers 49. However as can be readily appreciated, no particular arrangement of the various files, interfaces, objects, mechanisms, processes and so on described herein is necessary to the present invention. Indeed, as is understood in computing and networking in general, such files, interfaces, objects, mechanisms, processes and so on may be combined, separated and/or distributed in virtually any number of ways among the various network devices.

In general, the present invention provides a method and system for deploying software applications throughout a computer network in a highly flexible, scalable, extensible and efficient manner. To this end, the method and system leverage a highly flexible architecture wherein an administrator can tailor policies to sites, domains, and organizational units of users and computers thereunder, (in a hierarchical manner), by specifying one or more policies therefor, such that the policy within an organization is centrally managed. Such group policies, including the prioritizing of multiple policies for policy recipients (e.g., users or machines) are described in U.S. patent application Ser. No. 09/134,805, entitled "System and Method for Implementing Group Policy," assigned to the assignee of the present invention and hereby incorporated by reference herein in its entirety.

Figure 2:
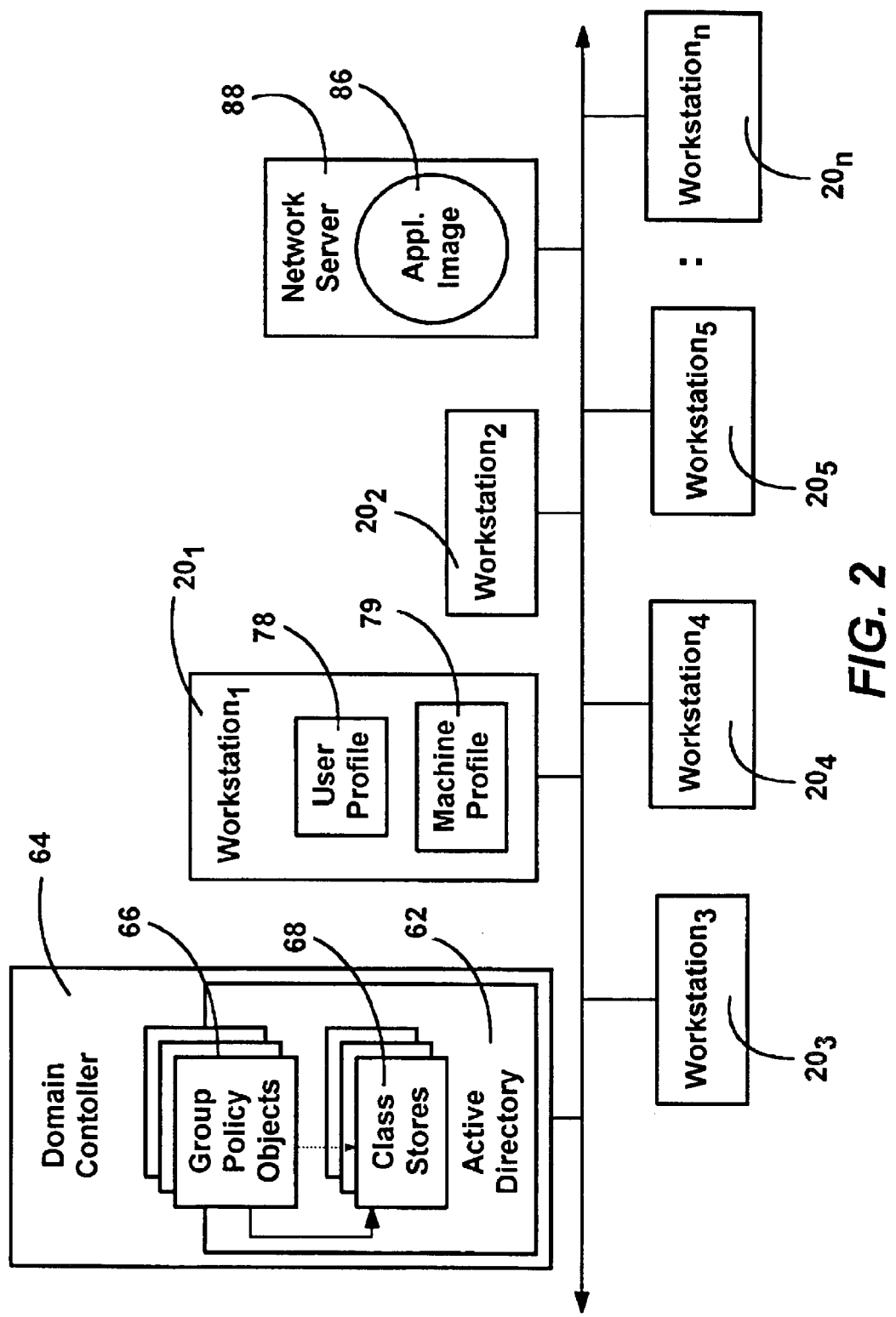
FIG. 2 is a block diagram generally representing a computer network into which the present invention may be incorporated.

Although not necessary to the present invention, group policies are maintained via a Windows NT® 5.0 directory service, known as the Active Directory 62, ordinarily maintained in a domain controller 64 (FIG. 2). More particularly, each group policy object 66 (FIG. 2) comprises a group policy container in the directory service and a group policy template in the "sysvol" of the domain controller 64, but for purposes of simplicity are generically referred to herein as a group policy object. In general, the Active Directory 62 stores information about the objects of a domain, and makes this information easy for administrators to access, find and apply via a single, consistent and open set of interfaces. For example, with the Active Directory 62, administrators have a single point of administration for the objects on the network, which can be viewed in a hierarchical structure. A core unit in the Active Directory 62 is the domain, and the objects of a network exist within a domain. A single domain can span multiple physical locations or sites.

Thus, the present invention is described herein with reference to the Microsoft® Windows NT® operating system, and in particular to the flexible hierarchical structure of sites, domains and/or organizational units of a Windows NT® Active Directory 62. Notwithstanding, there is no intention to limit the present invention to Windows NT® and/or the Active Directory architecture, but on the contrary, the present invention is intended to operate with and provide benefits with any operating system, architecture and/or mechanisms that utilize network information.

Application Deployment: Assign And Publish

In general, a primary aspect of application deployment involves initially making an application available to users. To initially deploy an application, an administrator can choose to either "assign" or "publish" the application. To this end, as shown in FIG. 2, one or more group policy objects (templates) 66 may be associated with policy recipients, and a subcontainer of each group policy object, deemed a class store, may include application deployment information. Note that although separately shown in FIG. 2 for purposes of simplicity, a class store 68 is actually a subcontainer of the group policy container, as described in more detail in co-pending United States Patent Application entitled "Class Store Schema," assigned to the same assignee as the present invention, filed concurrently herewith and hereby incorporated by reference herein in its entirety.

In accordance with one aspect of the present invention, via this centrally maintained deployment information in the class store 68, policy recipients (e.g., users and workstations/machines) in a domain are assigned applications, or applications are published thereto. An application typically is assigned to a group of users (or a group of machines) when it is deemed mandatory for that group to have that application, while published applications are those that are made optionally available to users who may benefit therefrom. For example, the same version of an electronic mail application program may be assigned to everyone in an organization, while a word processing program may be assigned to every group of users that needs some word processing capabilities. However, an application program for editing images may not be needed by everyone, and thus such a program may be published on a per-group basis so that those groups of users who may benefit from the program have it, while others who do not need it will not have it occupy resources of their workstations. Publishing is described in more detail below.

In accordance with one aspect of the present invention, assigned applications have a number of attributes, including that they are advertised, i.e., they appear as available to a user at each logon (if assigned to a user) or at each re-boot (if assigned to a machine). Note that advertised applications are not necessarily installed on the workstation, but rather may only appear to be installed. As described in more detail below, so as to make an application appear installed, advertisements for an application include shortcuts that appear on the Start Menu and/or placement of shortcuts/icons on the desktop, and a collection of registry entries required primarily for OLE and shell activation. For example, to explicitly launch an application, users navigate the Start Menu looking for a shortcut representing the application, then click that shortcut. Thus, shortcuts placed on the Start Menu represent a blatant advertisement for an application. Users also implicitly launch applications by double-clicking a file (of a file system) having an extension associated with a particular application. Since associations between file extensions and applications are stored in the system registry 70 (FIG. 3), writing such associations to the registry 70 is another way in which the present invention may advertise applications. Other examples of how an application is advertised include writing class information (i.e., for OLE/COM activation), MIME associations, type library information, and shell verbs. Note that shortcuts and default entries in the registry 70 may reference files that contain indexed icons that are normally application executables. However, when advertised, an application's executable may not be installed, which would otherwise render the icon unavailable. Icon files provide a place to store icons for shortcuts, and for default icon registry entries to reference.

Assigned applications are also resilient, in that they will be re-advertised on the next logon (or machine re-boot as appropriate) if deleted from the local workstation (machine) 20₁. For purposes of simplicity, assignment will hereinafter ordinarily be described with reference to being applied to users via a policy at user logon, although it is understood that policies may be applied to a machine when the machine connects to the network, e.g., at machine re-boot, and thus applications may be assigned to machines (e.g., via a machine profile 79) in the same general manner as users. Moreover, even if a user installs another program or different version of the application over an assigned application, because the advertise script is applied, the assigned application (the administrator-specified version) will return at the next logon. Only an administrator (and in particular a domain administrator) may permanently remove an assigned application, by doing so via the centralized location.

Figure 3:
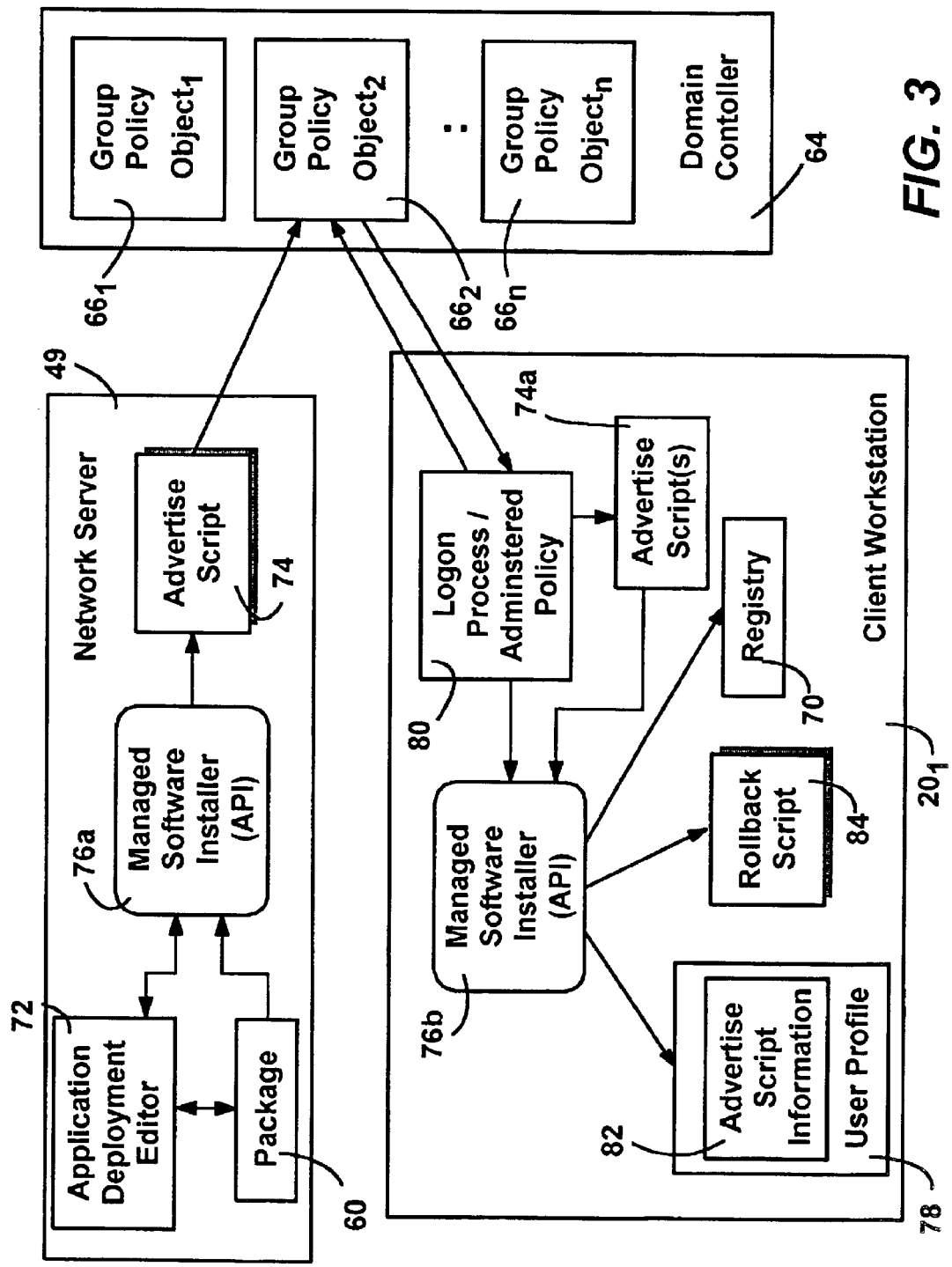
FIG. 3 is a block diagram generally representing exemplary components for assigning and publishing applications in accordance with various aspects of the present invention.

To assign an application, as generally shown in FIG. 3, the administrator, using an application deployment editor 72 or other suitable tool, selects an application package (e.g., 60). Packages are stored and cataloged under the class stores 68, and may be available from various vendors for different platforms, activation modes, access control, setup, and installation information. For example, a package 60 may include an entire application (e.g., Microsoft® Word or Excel), a set of binary component implementations packaged together, or a standalone COM (Component Object Model) component (e.g., an ActiveX™ control). Once a package 60 is selected for deployment, an advertise script 74, which includes information about the application, is generated by calling a function of an application programming interface of a managed software installer mechanism 76a.

The managed software installer mechanism 76a facilitates a number of deployment tasks, including advertising, which occurs when a package 60 (and any transforms encapsulating administrator customizations) are advertised into a group policy object (e.g., 66₂). As described below, the result of such an advertisement is the advertise script 74, a file that gets physically stored in the group policy object 662. At co logon time, a user having the group policy object 662 applied thereto receives a copy 74a of the advertise script (and other scripts). Note that the scripts may be copied from the domain controller's sysvol to the user profile 78, or processed from the network rather than physically copied, however, copying the scripts outside of the profile is preferable for security and performance reasons.

Logon code 80 then calls the managed software installer mechanism 76b to process the copied advertise script (or scripts) 74a, the result of which is the creation of a collection of advertisement information 82 including shortcuts on the Start Menu and registry entries required for shell and OLE activation, as also described below. Advertisement information references the managed software installer mechanism 76b, and, as described below, the operating system 35 knows what to do when it encounters such information. Lastly, the managed software installer mechanism 76b is involved when activation occurs, i.e., the managed software installer mechanism 76b is called when an application is activated to install one or more components as needed to service the activation request.

Thus, to summarize, via the managed software installer mechanism 76a, the application deployment editor causes the advertise script 74 to be stored for one or more groups of users (or machines) in a group policy object (template) (e.g., 66₂) of the Active Directory 62. In general, the application deployment editor 72 is an extension to a Group Policy Editor, which is a snap-in to the Microsoft Management Console, a common framework for administrative tools and processes. As described in the aforementioned "Group Policy" patent application, the Group Policy Editor is a tool used by an administrator to create, edit, and manage group policy objects 66, which associate policy with Active Directory containers (sites, domains and organizational units). The application deployment editor 72 extension thereto allows an administrator to deploy applications, i.e., the application deployment editor 72 is an administrative tool for assigning, publishing and removing software in a network of servers and workstations.

Thus, to assign an application, the administrator selects an application package 60 (e.g., provided by a vendor) and optionally transforms the package 60 to customize it to meet particular needs. By way of example of a transform, a spreadsheet program may be installed with customized spreadsheet templates needed in an organization. The administrator may also create network shares for the software, including executable, configuration, data files, components and packages, and the administrator may set up the application to run from the network. The administrator then causes the advertise script 74 to be generated.

More particularly, to generate the advertise script 74, 115 the application deployment editor 72 calls the MsiADvertiseProduct( ) API(application programming interface) of the managed software installer mechanism 76a with the information as set forth in the table below:

| | | |
|---|---|---|
| UINT MsiAdvertiseProduct( | | |
| LPCTSTR | szPackagePath | // Fully qualified path to a package |
| LPCTSTR | szScriptFilePath | // If NULL, product is advertised locally |
| LPCTSTR | szTransforms | // Semi-colon delimited list of transforms |

-continued

| | | |
|---|---|---|
| LANGID | idLanguage | // Language of product being advertised |
| ); | | |

Figure 4:
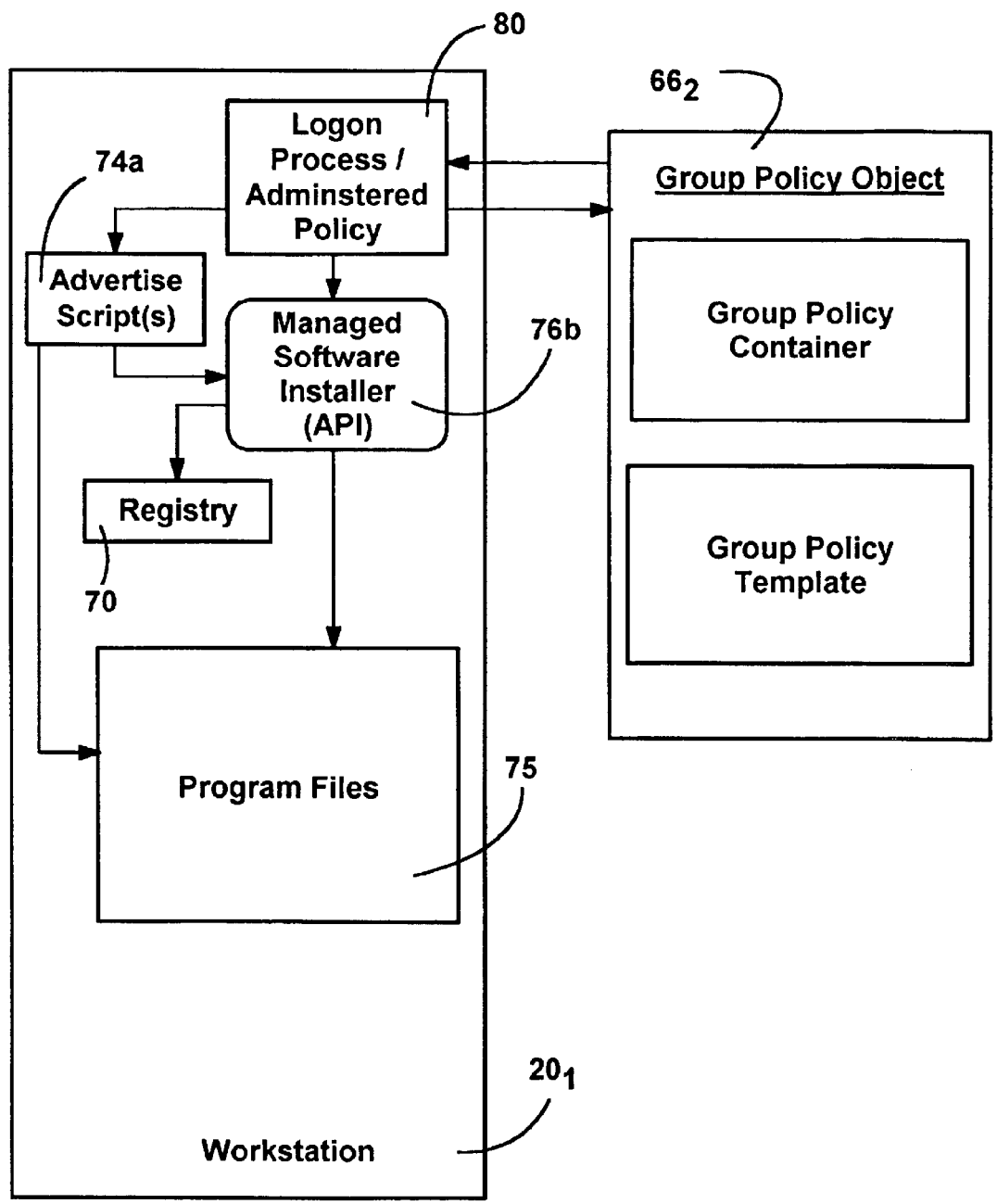
FIG. 4 is a block diagram generally representing how advertising scripts are copied to the workstation from the group policy object and then advertised via the installer in accordance with an aspect of the present invention.

Upon successful completion, the result is the advertise script 74 containing records for creating advertisement information, e.g., including shortcuts, icon files, and OLE and shell activation registry entries. Note that in the network environment, szScriptFilePath may specify a file stored in the applications folder of the group policy object 662 as represented in FIG. 4. In general, the advertise script 74 comprises information corresponding to a series of commands, API calls, or the like, such as resulting in standard API calls to write various information to the registry 70 at certain keys, add application shortcuts to the Start Menu, and so on. For purposes of simplicity, the usage of well-documented APIs to write information to a registry and add shortcuts to menu folders will not be described herein in detail.

Thus, in accordance with another aspect of the present invention and as generally shown in FIGS. 3 and 4, in a networked environment, at user logon, as part of a logon process 80, one or more group policy objects are ordinarily applied to the user that is logging on, which includes executing at least one advertise script therefor (such as the script 74). Note that policy, and thus application assignment, may also be applied by administered policy or the like, such as on a periodic basis as set by the administrator, (e.g., apply policy once every six hours), to enforce policy for machines that seldom re-boot or users that seldom logon. In general, executing the advertising script makes the application appear to be available to the user, including writing information to the system registry 70 and adding script information such as shortcuts to assigned programs to the user profile 78 (e.g., the Start Menu or desktop) on the workstation. Optionally, a rollback script 84 is generated so that any changes made during the logon process may be undone, such as if an error or failure occurs.

More particularly, the logon process 80 gathers up the new or modified advertise scripts from the group policy objects 66₁–66ₙ associated with the directory containers to which the user belongs, and stores them in a storage in the user's local workstation 201. Then, each of these advertise scripts is handed to the managed software installer mechanism 76b for processing, via the MsiAdvertiseScript( ) API, as set forth in the table below:

| | | |
|---|---|---|
| UINT WINAPI MsiAdvertiseScript ( | | |
| LPCTSTR | szScriptFile, | // path to script from MsiAdvertiseProduct |
| DWORD | dwFlags, | // the SCRIPTFLAGS bit flags that control the script execution |
| PHKEY | phRegData, | // optional parent registry key |
| BOOL | fRemoveItems); | // TRUE if specified items are to be removed |

Possible bits for the "dwFlags" argument include:

```
Typedef enum tagSCRIPTFLAGS
{
    SCRIPTFLAGS_CACHEINFO      = 0x00000001L,    // set if the icons need to be
                                                 // created/ removed
    SCRIPTFLAGS_SHORTCUTS      = 0x00000004L,    // set if the shortcuts needs to
                                                 // be created/ deleted
    SCRIPTFLAGS_MACHINEASSIGN  = 0x00000008L,    // set if product to be
                                                 // assigned to machine
    SCRIPTFLAGS_REGDATA_APPINFO  = 0x00000010L,  // set if the app advt
                                 // registry data needs to be written/ removed
    SCRIPTFLAGS_REGDATA_CNFGINFO = 0x00000020L, // set if the product cnfg
                                 // mgmt. registry data needs to be written/ removed
    SCRIPTFLAGS_REGDATA        = SCRIPTFLAGS_REGDATA_APPINFO |
    SCRIPTFLAGS_REGDATA_CNFGINFO, // for source level backward compatibility
    SCRIPTFLAGS_VALIDATE_TRANSFORMS_LIST = 0x00000040L
} SCRIPTFLAGS;
```

The MsiAdvertiseScript( ) serially executes the list of advertise script information in accordance with the above parameters. Once successfully processed, an advertise script w stores information in the user's profile 78 and the system registry 70 that is used to manage advertised applications. This set of per-user information includes attributes for each advertised product, source list information, feature-to-product associations, and descriptors for each advertised component. An association between the managed software installer mechanism 76 and the operating system 35 facilitates advertising. For example, shell and OLE activation code, as well as many shell and OLE-related registry entries, are preferably installer mechanism-aware. To this end, managed shortcuts include a descriptor that the shell activation code (of the operating system 35) detects, hands to the managed software installer mechanism 76b for resolution in the form of a path, and then processes the resulting path. Similarly, OLE activation is aware of such descriptors and calls an API of the managed software installer mechanism 76b to resolve them.

To manage the advertised applications, the managed software installer mechanism 76b uses the identifiers set forth in the following table:

| | |
|---|---|
| {ProductCode} | A standard GUID which uniquely identifies a product. |
| FeatureID | A string which represents a feature. A FeatureID should be human readable and need only be unique within a given product. |
| {ComponentCode} | A standard GUID which uniquely identifies a component. |
| [Descriptor] | A descriptor is comprised of a {ProductCode}, a FeatureID and a {ComponentCode} within square brackets, e.g., [{ProductCode}FeatureIDdelimiter{ComponentCode}]. A delimiter exists between the FeatureID and the {ComponentCode} since a FeatureID is variable in length. |
| Delimiter | ASCII value 2, chosen so as to not collide with characters that might appear as part of a FeatureID |

General properties for each advertised product are stored under a Products key by {ProductCode}.

An administrator may also choose to publish an application, essentially to make the application available to a user if needed. Published applications are just as manageable as assigned applications, however unlike assigned applications, a published application has no presence on a user's machine until invoked. Thus, a published application has no attributes on the client machine, but rather has its attributes stored in the Active Directory 62. A published application can be located in the Active Directory in a number of ways, including via the application name, a class ID serviced by the application, a program ID serviced by the application, a file extension serviced by the application, an interface identifier serviced by the application and MIME type or content type serviced by the application.

To this end, each of the above attributes may be used as the key to locate a published application in the Active Directory. Then, once a published application is located, the application's user-friendly (human readable) name is available, as well as enough information to assign the application to the user. Thus, until needed, a published application does not look installed. For example, there are no shortcuts present to use for activating the application, (however it should be noted that this does not prevent an administrator from placing a document managed by a published application on the desktop or the Start Menu, which is not the same as application assignment). Instead, published applications may be activated by the above-attributes such as file extension, in a two-step process as described below with particular reference to FIGS. 8–9. First the operating system 35 shell (or similarly OLE) attempts to locate the application activation information in the local machine's registry 70. If the information is not found (as with a published application), an Active Directory 62 lookup occurs (as described in the aforementioned "Class Store Schema" patent application). If the directory lookup is successful, the return information is used to assign the application to the user's profile. Note that the user may be given a roaming profile, whereby such information roams with the user regardless of where the user logon takes place. If not, the information stays on the machine that triggered the assignment. In this manner, published applications as well as assigned applications essentially follow the user around. Once the application is assigned, activation continues as with normal assigned applications as described above.

Moreover, the "Desktop-New" context menu may choose to not list published applications, nor need the "Insert-object" menus of applications list published applications. However, another way in which a published application may be assigned is manually, via the "Add/Remove Programs" Control Panel applet. To this end, the class store 68 is queried and the list of installable programs provided to the user includes those published programs listed in the class store or stores associated via the policy objects with that user's group or groups.

Once advertised, the applications may be installed on the local workstation $20_1$ by the managed software installer mechanism 76b on an as-needed basis, e.g., as Program Files 75 (FIG. 4) in the file system, the place where the actual application files are stored. For example, the first time that a user activates such an application (e.g., via the Start Menu), the managed software installer mechanism 76b looks for it on the local machine but does not find it, after which the managed software installer mechanism 76b installs the application from an application image 86 (FIG. 2) on a network server 88. Note that the network server 88 may be the same server 49 on which the application package 60 was loaded, however as can be appreciated, this is not necessary. Thereafter, the application remains on the local workstation $20_1$ and need not be re-installed, unless deleted in some manner. However, even if deleted, the application will be re-advertised the next time policy is applied, e.g., at the next user logon, whereby if again activated, the application will again be re-installed. In this manner, assigned applications are automatically deployed in accordance with a policy, but for purposes of efficiency, initially may be only advertised rather than installed. As can be readily appreciated, installing programs only if and when activated provides substantial benefits, including efficient use of workstation resources, rapid user-logon, and balancing of the load on the network servers. The on-demand installation of software implementations including applications (e.g., features, components and files) is described in copending United States Patent Applications entitled "Method and System for On-Demand Installation of Software Implementations" and "Software Implementation Installer Mechanism," assigned to the same assignee as the present invention, filed concurrently herewith, and hereby incorporated by reference herein in their entireties.

Figure 5:
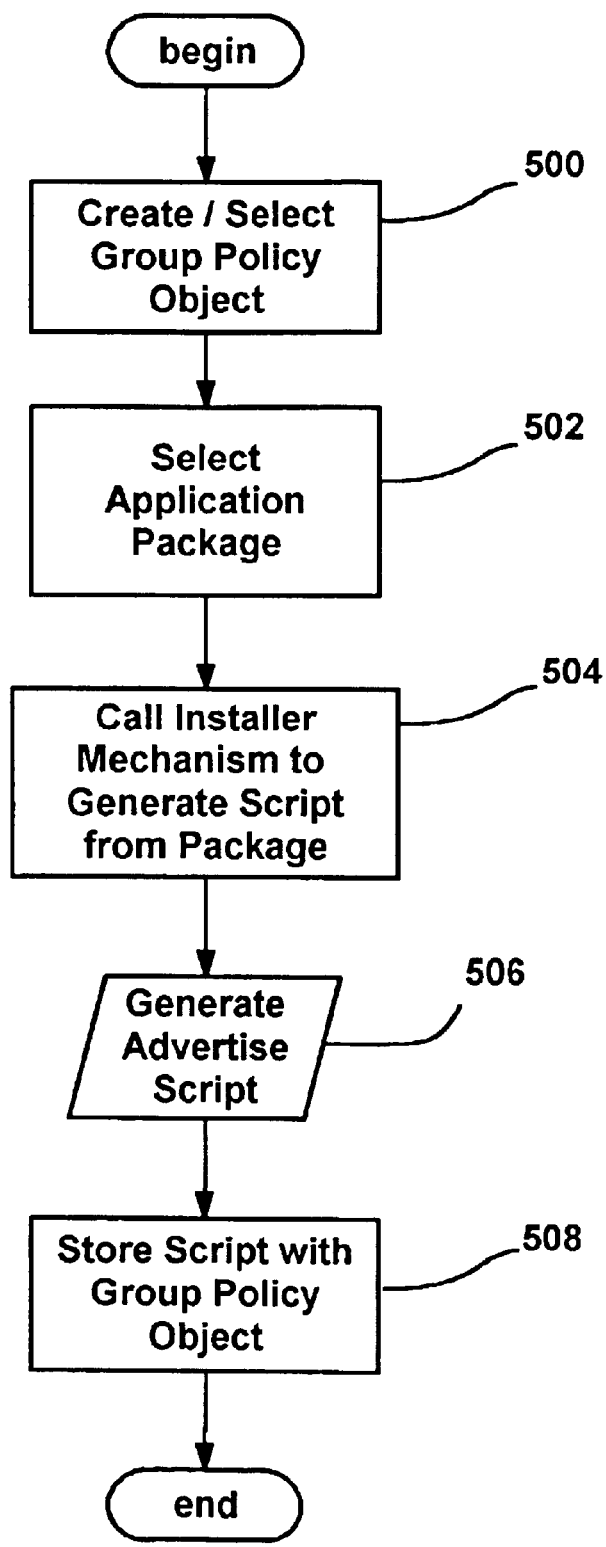
FIG. 5 is a flow diagram generally representing the steps taken to assign an application in accordance with one aspect of the present invention.

Turning to an explanation of the operation of the present invention, FIG. 5 shows the general steps taken to assign an application, such as to users of a Directory container (site, domain or organizational unit). At step 500, the administrator creates or selects (via the group policy editor/application deployment editor tool 72) the group policy object (e.g., 662) associated with the appropriate directory container. Then, at step 502 the administrator selects the application package 60 to be assigned, along with any transforms applied to the package 60. The application deployment editor tool 72 calls the installer mechanism 76a at step 504, whereby the advertise script 74 is generated in step 506. Lastly, at step 508, the script 74 is stored with the group policy object 662.

Figure 6:
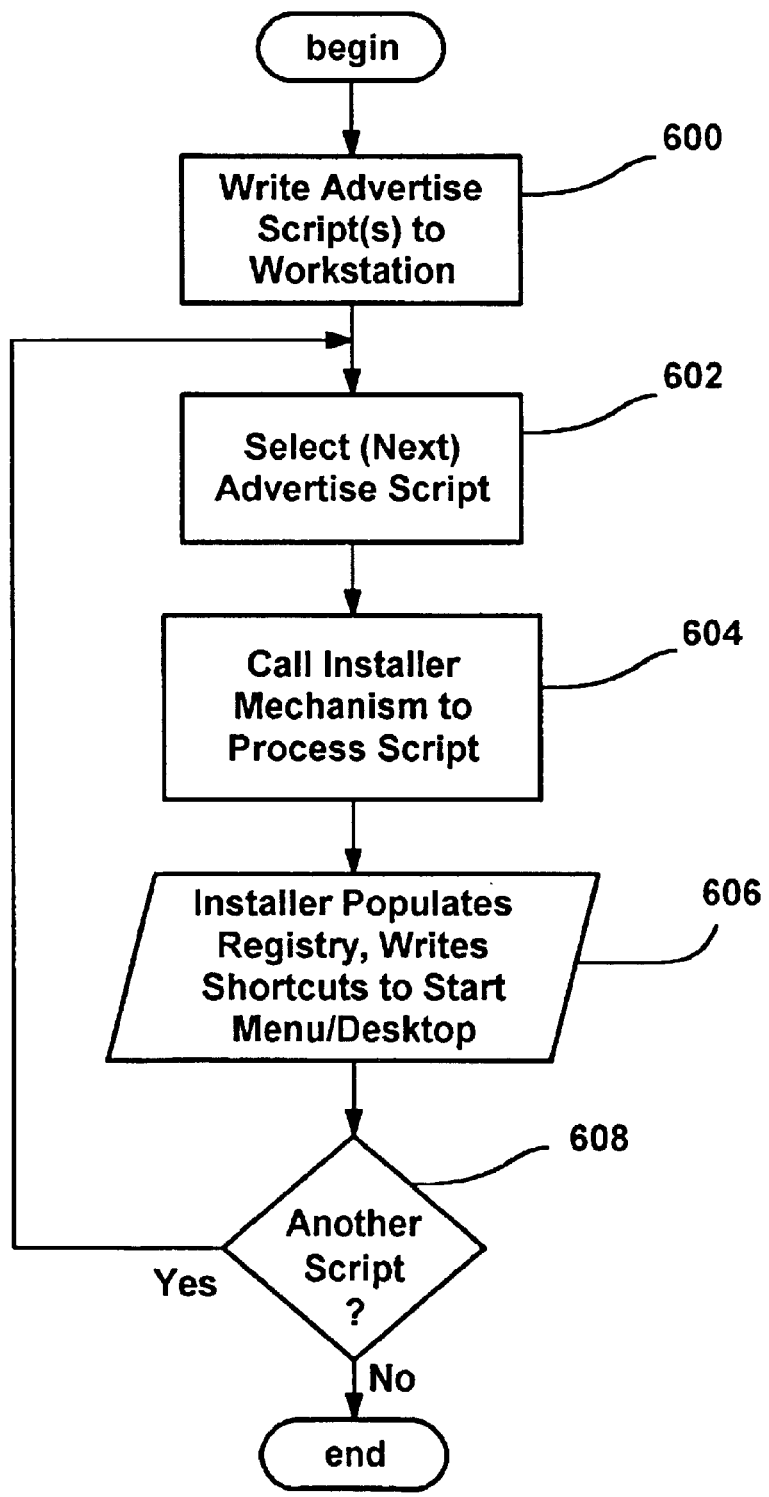
FIG. 6 is a flow diagram generally representing the steps taken at user logon to advertise an assigned application in accordance with another aspect of the present invention.

FIG. 6 shows the steps taken by the logon process 80 at user logon, beginning at step 600 wherein as part of applying the group policy object 662 (and any other objects), the logon process 80 writes the advertising script 74 (and any other scripts) to the user workstation $20_1$. At step 602, an advertise script (a first one from the copies 74a) is selected from the user profile. To resolve potential conflicts in accordance with policy settings, the selection may be in a prioritized order, (as described in the aforementioned "Group Policy" patent application). In any event, once selected, the installer mechanism 76b is called at step 604 to process the script as described above, i.e., populate the registry 70 with information such as file-extension associations, write application shortcuts to the user's Start Menu or desktop and so on as represented by step 606. Step 608 repeats the processing of scripts until there are no more to process.

Figure 7:
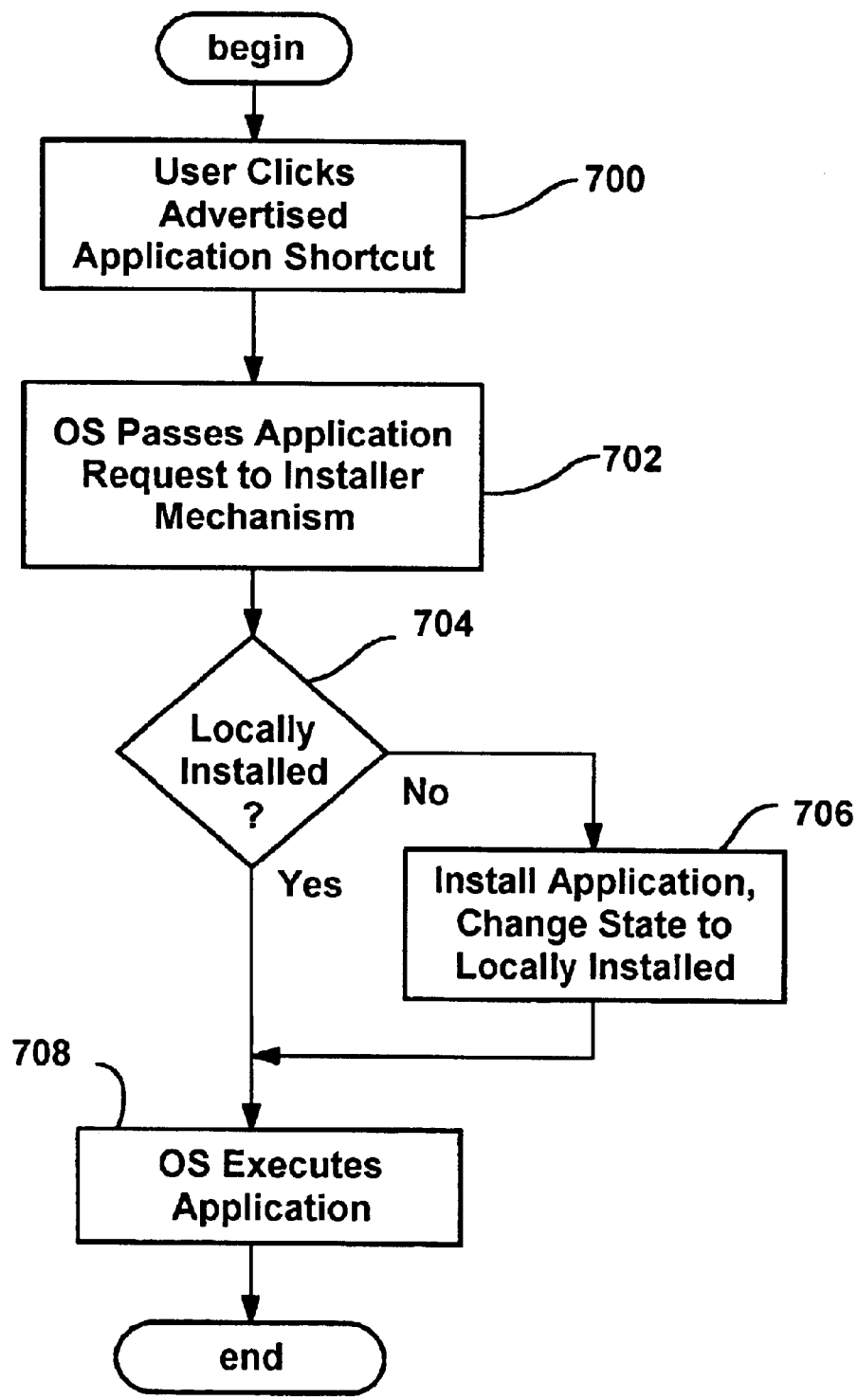
FIG. 7 is a flow diagram generally representing the steps taken when a user activates an assigned application via a shortcut.

Once the one or more scripts are processed, assigned applications are advertised as available to the user. One way in which a user may activate such an application is by clicking a shortcut corresponding thereto. FIG. 7 shows the general steps taken when a user clicks a shortcut, beginning at step 700. At step 702, the operating system 35 communicates with the managed software installer mechanism 76b to determine if the application is locally installed, one of the possible states of an advertised application. At step 704, if the application is not-locally installed, the installer 76b installs it (or at least some core portion thereof) at step 706, as described in more detail in the aforementioned copending United States Patent Applications entitled "Method and System for On-Demand Installation of Software Implementations" and "Software Implementation Installer." Also, the state of the application is changed to installed, so that the next time activation thereof is requested, installation is not necessary. Lastly, at step 708, the installer and the operating system 35 execute the application. Note that except for possible installation delay times, in typical situations, the installation is essentially invisible to the user.

Figure 8:
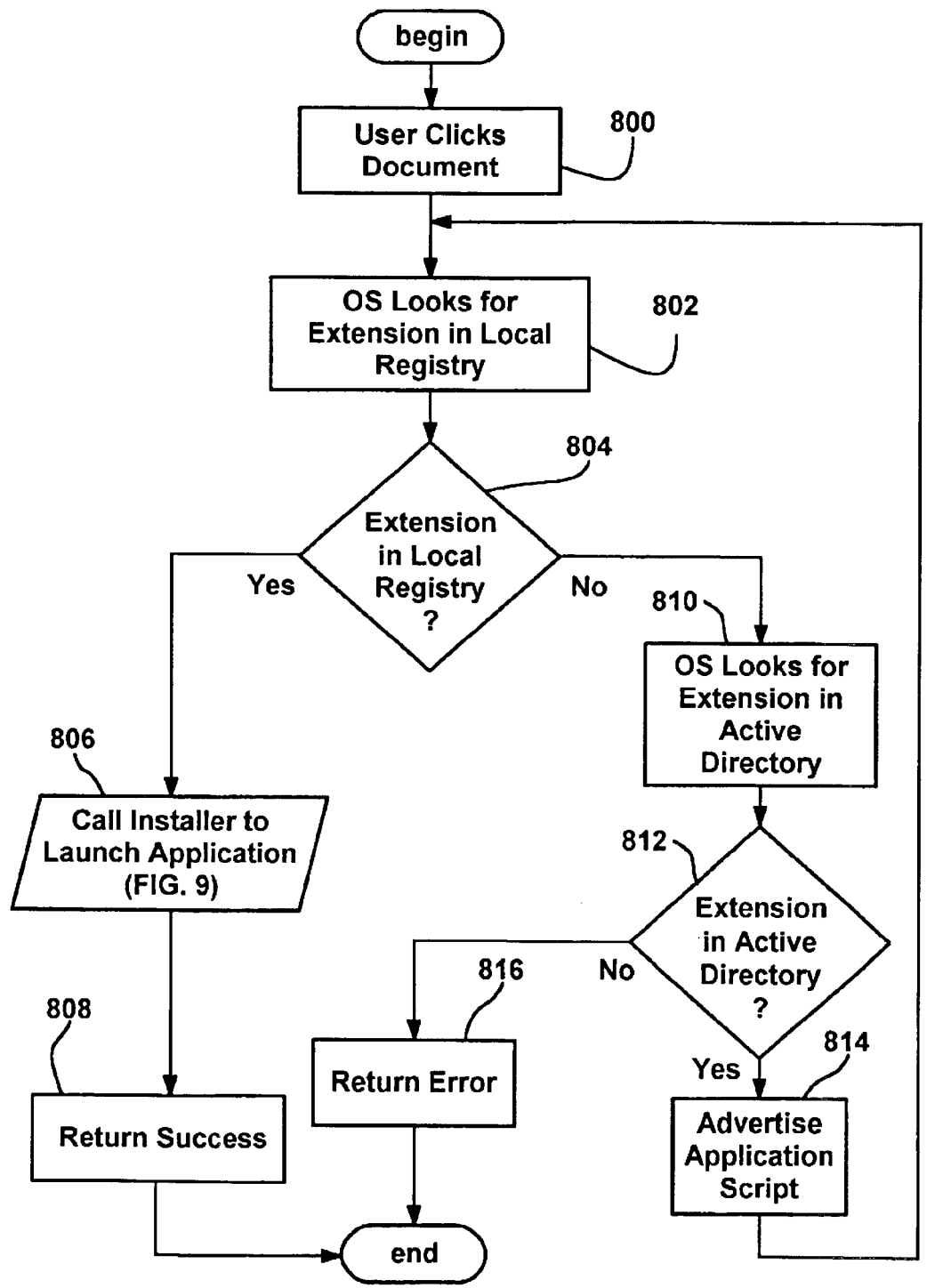
FIG. 8 is a flow diagram generally representing the steps taken when a user attempts to activates an application via an file extension associated therewith.
Figure 9:
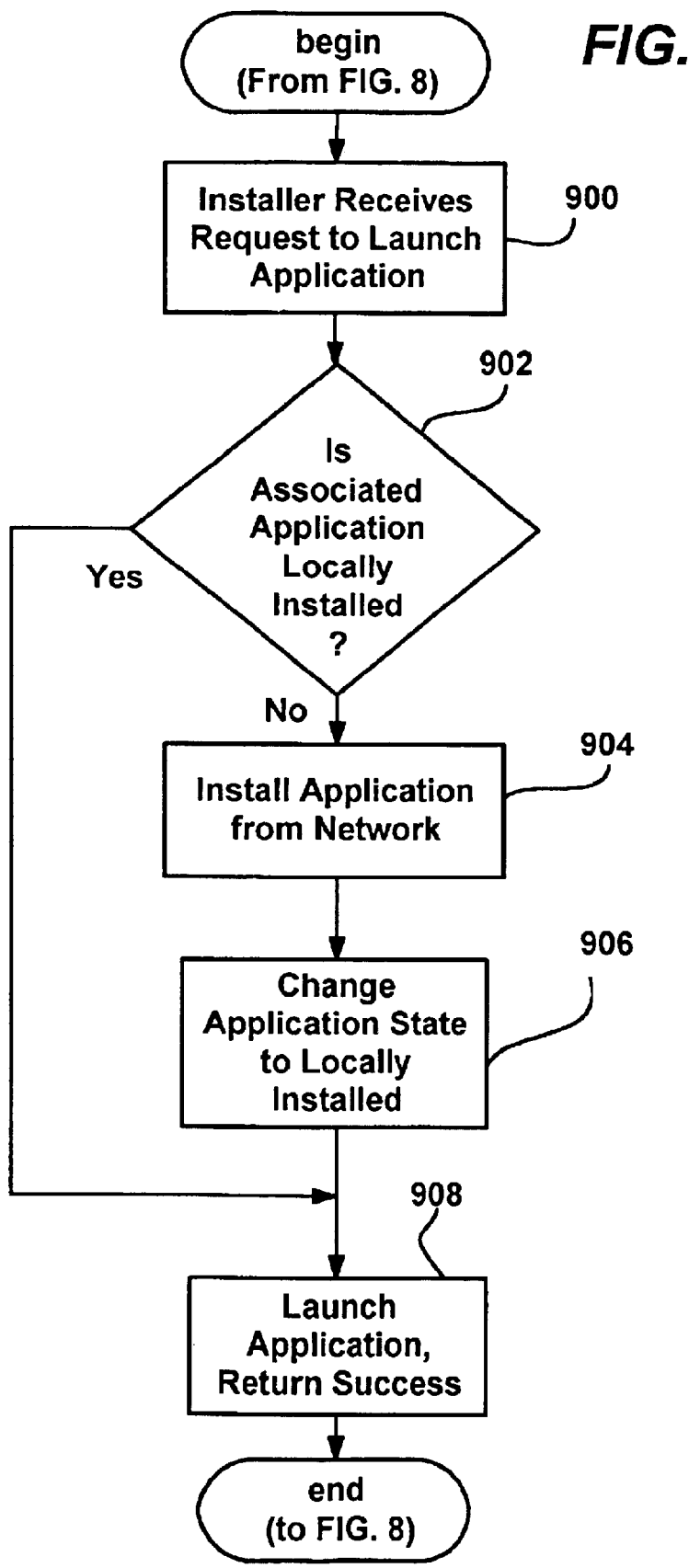
FIG. 9 is a flow diagram generally representing the steps taken by an installer mechanism to locate an application associated with a file extension.

Both assigned and published applications may be activated by invoking (e.g., double-clicking) a file (document) having an extension with an associated application registered in the registry. FIGS. 8 and 9 show how such an action leads to the file being executed, beginning at step 800 which represents the double-clicking (or similar operation such as right-click, open) of the document. At step 802, the operating system 35 looks to the local registry 70 for file extension information, i.e., an application associated with the file extension. If the information is found, step 804 branches to step 806 which then calls the installer 76b to launch the application (FIG. 9) as described below. Note that the administrator may prioritize which application handles which extension since multiple applications may be capable of handling the same file type.

If not found in the local registry at step 804, then an application corresponding to the extension has not been assigned, however an application corresponding to the extension may still be published to the requesting user. Thus, step 804 branches to step 810 to look for the extension information in the Active Directory, i.e., the class stores 68 associated with this user. To determine this, step 810 queries the class store or stores 68 to find the appropriate a script or scripts and look in the scripts for the file association. Note that the administrator may similarly prioritize which application in the class stores handles which extension. If found, the application script is advertised at step 814 as described above, i.e., the application is effectively assigned to the user, the registry is populated, the item added to the Start Menu, and so on as if the application was assigned. The process then returns to step 802 so that the application may be launched. Conversely, if no associated application is found in the class stores at step 812, an appropriate error is returned (e.g., no association for this application for this user) at step 816.

FIG. 9 shows the steps taken by the installer 76b to launch the application. When the installer 76b receives the extension information, (step 900), the managed software installer mechanism 76b determines if the application is locally installed at step 902, one of the possible states of an advertised application. If the application is not locally installed, the installer 76b installs it (or at least some core portion thereof) at step 904, as described in more detail in the aforementioned copending United States Patent Applications entitled "Method and System for On-Demand Installation of Software Implementations" and "Software Implementation Installer." Also, at step 906, the state of the application is changed to installed, so that the next time activation thereof is requested, installation is not necessary. Lastly, at step 908, the installer launches the application. Regardless of whether previously installed or not, and assuming no other errors, security problems and so forth, success is returned at step 808 (FIG. 8), and the application appropriately opens the document.

As can be seen from the foregoing detailed description, there is provided a method and system for automatically deploying applications across a network in accordance with a policy. Via a script associated with a policy, and applied at user logon or machine connection to the network, applications may be assigned to policy recipients (users or machines), whereby the assigned applications are advertised to those policy recipients. Other applications may be published to users, whereby the application may be indirectly activated.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer network, a method of deploying a plurality of programs to a policy recipient, comprising, maintaining an association between each program and the policy recipient, at least one association corresponding to a program that is assigned as mandatory for the policy recipient to have on a computer system associated with that policy recipient, and at least one other association corresponding to a program that is published as optional for the policy recipient to have on the computer system associated with that policy recipient, determining a time for deploying each assigned program to the policy recipient and making that program available to the policy recipient at that time, and deploying each published program to the policy recipient when the published program is activated via the computer system.

2. The method of claim 1 wherein the policy recipient is a user, and wherein determining a time for deploying each assigned program to the policy recipient includes detecting that the user is logging on to the network.

3. The method of claim 1 wherein the policy recipient is a machine comprising the computer system, and wherein determining a time for deploying each assigned program to the policy recipient includes detecting that the machine is connecting to the network.

4. The method of claim 1 wherein determining a time for deploying each assigned program to the policy recipient includes polling machines in the network.

5. The method of claim 1 further comprising, detecting a request to run a selected one of the assigned programs, accessing the registry to locate the selected assigned program, and executing the selected assigned program.

6. The method of claim 1 wherein maintaining an association between each assigned program and the policy recipient comprises storing at least one script in association with policy information for that policy recipient.

7. The method of claim 6 wherein storing each script comprises maintaining a centralized directory of network objects.

8. The method of claim 1 wherein making the program available to the policy recipient comprises advertising the program as available for execution prior to installation of program code used to execute the program on the computer system, and further comprising, in response to a request to execute the program, installing the program code at the computer system and executing the program code.

9. The method of claim 8 wherein advertising the program as available includes adding an application shortcut to a user profile such that a user perceives the program as executable prior to installation of program code used to execute the program on the computer system.

10. The method of claim 1 wherein making the program available to the policy recipient comprises writing information to a registry associated with the policy recipient such that a request related to executing the program prior to installation of program code used to execute the program on the computer system will have corresponding information in the registry that identifies the program for automatic installation and execution thereof.

11. The method of claim 10 wherein writing information to the registry comprises maintaining in the registry an association between the program and class identifier information.

12. The method of claim 10 wherein writing information to the registry comprises maintaining in the registry an association between the program and a file extension.

13. The method of claim 12 further comprising, detecting a user request to open a file, determining the file extension and accessing the registry to locate a corresponding program associated with the file extension, and opening the file with the corresponding program.

14. The method of claim 13 further comprising, determining if the program is locally installed, and if not installed, installing the program and executing the program to open the file.

15. In a computer network, a method of automatically deploying an assigned program to a policy recipient, comprising, generating a script having information therein corresponding to the assigned program, associating the script with a policy, applying the policy to the policy recipient by processing the script at a computer associated with the policy recipient to advertise the assigned program as available for execution by the policy recipient prior to installation of program code needed to execute the program, wherein the program is installed such that the program is installable on demand in response to a request to execute the program.

16. The method of claim 15 wherein the policy recipient is a user, and wherein applying the policy to the policy recipient is performed as part of a user network logon process.

17. The method of claim 15 wherein the policy recipient is a machine, and wherein applying the policy to the policy recipient is performed as part of a re-boot process of the machine.

18. The method of claim 15 wherein associating the script with a policy comprises maintaining the association in a centralized directory of network objects.

19. The method of claim 15 wherein applying the policy to the policy recipient includes adding an application shortcut to a user profile to advertise the program as available for execution.

20. The method of claim 15 wherein applying the policy to the policy recipient includes writing information to a registry associated with the policy recipient to advertise the program as available for execution.

21. The method of claim 20 wherein writing information to a registry comprises maintaining in the registry an association between the program and class identifier information.

22. The method of claim 20 wherein writing information to a registry comprises maintaining in the registry an association between the program and a file extension.

23. In a computer network, a system for deploying programs to policy recipients, comprising, a centralized store of policy objects, at least one of the policy objects having an advertise script associated therewith, the advertise script including program information of at least one program for assigning to policy recipients, and a mechanism for applying policy objects to a policy recipient, wherein at least one of the policy objects applied to that recipient has the advertise script associated therewith, the mechanism processing the script to advertise at least one assigned program to the policy recipient such that the assigned program is advertised as available for execution by the policy recipient prior to installation of program code needed to execute the program.

24. The system of claim 23 wherein at least one of the policy objects further associates a published program with a policy recipient, the published program deployed to a computer system corresponding to the policy recipient when the published program is activated.

25. The system of claim 23, wherein the policy recipient comprises a user, and wherein the mechanism processes the advertise script when the user is logging on to the network.

26. The system of claim 23 wherein the policy recipient comprises a machine, and wherein the mechanism processes the advertise script when the machine connects to the network.

27. The system of claim 23 wherein in processing the script, the mechanism adds an application shortcut to a user profile to advertise at least one assigned program to a user as being executable.

28. The system of claim 23 wherein in processing the script, the mechanism writes data to the registry to advertise at least one assigned program to the policy recipient.

29. The system of claim 28 wherein the data written to the registry comprises class identifier information.

30. The system of claim 28 wherein the data written to the registry comprises file extension association information.

31. The system of claim 23 further comprising an installer that installs an advertised program in response to a request to execute the advertised program.

32. In a computing environment, a method comprising:
maintaining deployment information in association with a policy recipient, the deployment information comprising:
1) assigned program data, the assigned program data identifying assigned programs that upon a deployment event are made available to the policy recipient via automatic deployment to a computer system associated with the policy recipient;
2) published program data, the published program data identifying published programs that are published to the policy recipient for optional deployment to the computer system associated with the policy recipient, each published program deployed upon a detected need for that published program;
automatically configuring a computer system associated with the policy recipient upon a deployment event, to have the assigned programs available for execution; and
configuring the computer system with a selected published program upon a detected need for that selected published program.

33. The method of claim 32 wherein the policy recipient is a user, and wherein the deployment event corresponds to the user logging on to the network.

34. The method of claim 32 wherein the policy recipient is a machine, and wherein the deployment event corresponds to the machine connecting to the network.

35. The method of claim 32 further comprising, detecting a request to run a selected one of the assigned programs, accessing the registry to locate data related to the selected assigned program, and executing the selected assigned program.

36. The method of claim 32 wherein configuring the computer system to have the assigned programs available for execution comprises advertising the program as available for execution prior to installation of program code used to execute the program on the computer system.

37. The method of claim 36 and further comprising, in response to a request to execute the program, installing the program code at the computer system and executing the program code.

38. The method of claim 36 wherein advertising the program as available includes adding an application shortcut to a user profile.

39. The method of claim 36 wherein advertising the program as available comprises writing information to a registry associated with the policy recipient.

40. A computer-readable medium having computer-executable instructions, comprising, maintaining an association between each program of a plurality of programs and a policy recipient, at least one association corresponding to a program that is assigned as mandatory for the policy recipient to have on a computer system associated with that policy recipient, and at least one other association corresponding to a program that is published as optional for the policy recipient to have on the computer system associated with that policy recipient, determining a time for deploying each assigned program to the policy recipient and making that program available to the policy recipient at that time, and deploying each published program to the policy recipient when the published program is activated via the computer system.

41. A computer-readable medium having computer-executable instructions, comprising:
maintaining deployment information in association with a policy recipient, the deployment information comprising:
1) assigned program data, the assigned program data identifying assigned programs that upon a deployment event are made available to the policy recipient via automatic deployment to a computer system associated with the policy recipient;
2) published program data, the published program data identifying published programs that are published to the policy recipient for optional deployment to the computer system associated with the policy recipient, each published program deployed upon a detected need for that published program;
automatically configuring a computer system associated with the policy recipient upon a deployment event, to have the assigned programs available for execution; and
configuring the computer system with a selected published program upon a detected need for that selected published program.

* * * * *